United States Patent [19]
Lauro et al.

[11] Patent Number: 5,604,485
[45] Date of Patent: Feb. 18, 1997

[54] RF IDENTIFICATION TAG CONFIGURATIONS AND ASSEMBLIES

[75] Inventors: George L. Lauro, Lake Zurich; Rudyard L. Istvan, Winnetka; Sanjar Ghaem, Palatine, all of Ill.

[73] Assignee: Motorola Inc., Schaumburg, Ill.

[21] Appl. No.: 49,804

[22] Filed: Apr. 21, 1993

[51] Int. Cl.⁶ .................................................. G08B 13/14
[52] U.S. Cl. ..................... 340/572; 340/503; 340/825.21; 340/825.34; 340/825.54
[58] Field of Search ....................... 340/572, 568, 340/825.21, 825.34, 825.54; 156/247; 235/492

[56] References Cited

U.S. PATENT DOCUMENTS

| | | | |
|---|---|---|---|
| 3,671,721 | 6/1972 | Hunn et al. | 340/825.35 |
| 4,029,945 | 6/1977 | Yamada et al. | 235/492 |
| 4,413,254 | 11/1983 | Pinneo et al. | 340/572 |
| 4,752,680 | 6/1988 | Larsson | 235/492 |
| 4,802,944 | 2/1989 | Benge | 156/247 |
| 4,829,288 | 5/1989 | Eisenbeis | 340/572 |
| 4,855,583 | 8/1989 | Fraser et al. | 235/492 |
| 4,940,968 | 7/1990 | De Nood | 340/572 |
| 4,967,185 | 10/1990 | Montean | 340/572 |
| 5,119,070 | 6/1992 | Matsumoto et al. | 340/572 |
| 5,241,298 | 8/1993 | Lian et al. | 340/572 |
| 5,245,317 | 9/1993 | Chidley et al. | 340/572 |
| 5,258,766 | 11/1993 | Murdoch | 340/572 |

FOREIGN PATENT DOCUMENTS 2246492  1/1992  United Kingdom ............ H04B 1/59

Primary Examiner—Jeffery Hofsass
Assistant Examiner—Benjamin C. Lee
Attorney, Agent, or Firm—Phillip H. Melamed

[57] ABSTRACT

An RF tag (10) includes a plurality of RF resonant circuits (14, 18, 22) which are disposed in a three-dimensional array within a body (30) of solid material. Selected ones of the RF resonant circuits are coated with a conductive ink (36) for programming the RF tag. Non-planar RF resonant circuits (40, 50) provide enhanced directivity. The RF resonant circuits (14, 40, 50) are disposed within an elongated body (72, 82, 94) in spaced apart and substantially axially aligned relation to provide elongated RF tag configurations. An RF tag assembly (110) includes attachment mechanisms (116, 118) for attaching an RF tag (128) to a carrier. A dual mode RF tag assembly (140) is also provided which includes a passive RF circuit (144) and an active RF circuit (142).

35 Claims, 6 Drawing Sheets

RF IDENTIFICATION TAG CONFIGURATIONS AND ASSEMBLIES

FIELD OF INVENTION

The present invention generally relates to the field of RF tags for use in RF tagging systems in which the presence of resonant circuits on a tag are detected to generate a code determined in accordance with which resonant circuits are being detected. More particularly, the present invention relates to RF tag resonant circuit constructions having improved directional characteristics and to RF tag configurations wherein the resonant circuits are arranged in a three-dimensional array. The present invention is further directed to RF tag assemblies which exhibit improved convenience in use and transport.

BACKGROUND OF THE INVENTION

Prior art systems are known in which the existence of a single resonant circuit in a detection field or zone is utilized as an anti-theft type apparatus. Essentially, if an article having a single resonant frequency tag passes through a detection zone, an alarm is generated which indicates the unauthorized presence of store goods in the detection zone. Such resonant circuits have been constructed in accordance with standard printed circuit board techniques.

Some prior RF tagging systems have provided multiple different tuned (resonant) circuits on a tag so as to specifically identify the goods to which the tag is attached or the destination to which those goods should be directed. Such systems have been proposed for parcel or other article delivery systems wherein resonant circuits are utilized to provide a destination or sender code rather than printed bar codes.

The use of resonant circuit tagging is advantageous in that it is not subject to problems such as dirt obscuring a portion of a printed bar code and causing an error in determining the code associated with the article. Such prior systems utilizing multiple tuned circuit detection contemplate sequentially generating or gating each of the different resonant frequency signals to a transmitter antenna, and then waiting for reflected energy from each of the tuned circuits to be detected. Other frequency tagging systems look for absorption of RF energy by a resonant circuit during the transmission of each test frequency signal.

Prior RF tagging systems contemplate printing the different resonant frequency circuits on a tag in a single plane and then creating different codes by the selective removal of metallization from the resonant circuits. Some systems have recognized that step adjustments of the resonant frequency of such tuned circuits is desirable and this has been implemented by punching holes of predetermined diameters in capacitive elements of the resonant circuit to thereby reduce capacitance and increase the frequency of the resonant circuit.

When it is possible to accurately control the orientation between the resonant multiple frequency tag and the detection zone, some prior systems have noted that fewer different resonant frequencies may be needed to produce the desired end coding result. However, these prior systems accomplish this result by just limiting the number of circuits in the detection zone so that the zone can only accommodate a few different tuned circuits at one time. This has the undesirable effect of effectively requiring wide spacing between tuned circuits on a tag and therefore undesirably increasing the size of the tag on which the tuned circuits are provided.

An improved RF tagging system is fully described in co-pending application Ser. No. 07/966,653, filed on Oct. 26, 1992, in the names of Sanjar Ghaem, Rudyard L. Istvan, and George L. Lauro, for RF Tagging System and RF Tags and Method, which application is assigned to the assignee of the present invention and fully incorporated herein by reference. The system there disclosed includes, as a significant feature, the simultaneous radiation of RF energy at a plurality of different frequencies in order to detect each of a plurality of different frequency resonant circuits which may be provided on a tag. The resonant circuits may be detected by sensing reflected energy from each of the tuned circuits to be detected or by sensing absorption of RF energy by the resonant circuits during the transmission of the simultaneous radiation of RF energy at the plurality of different frequencies. Then a code signal indicative of which resonant frequencies for the tag resonant circuits were detected is provided. The above feature results in fast detection of the resonant frequency circuits provided on a tag. The cross-referenced application further describes an advantageous configuration for step frequency adjusting the resonant frequencies of resonant circuits on a tag and additionally, an RF tagging system which utilizes focused narrow radiation beams for detection of individual resonant circuits on a multiple resonant frequency tag. Also disclosed are preferred RF tag configurations or constructions and a method of making such tags. Additionally, the aforementioned cross-referenced application describes RF tagging system features related to the use of phase shifting or polarization, object approach detection and measuring both voltage and current signals so as to provide improved RF tag detection systems.

In accordance with the present invention, it has been recognized that the prior art technique of forming the resonant circuits in a single plane can greatly limit the number of resonant circuits which may be employed in a given RF tag area. This either limits the number of potential different identifying codes or increases the size of the tags when a greater number of identifying codes is desired. It has also been recognized that by forming the resonant circuits in a single plane, the directional characteristics of the resonant circuits are optimum in a direction normal to the plane of the resonant circuits. This may not always be appropriate for all applications. To that end, it is envisioned that RF tags may be used to advantage in a number of applications other than in applications where the tags are applied to articles. For example, passive RF tags may be used for employee identification purposes or as an implantable transponder. Prior art passive RF tag configurations do not conveniently lend themselves to such applications.

In addition, prior art RF tags have been limited to a particular type of RF tag, either a passive RF tag including only passive resonant circuits which resonate for identification responsive to receiving RF energy or an active RF tag including only a transmitter for transmitting an identifying RF signal. Either type of tag will, in some instances, not respond properly for identification. For example, if some of the passive resonant circuits are shielded from the RF energy, the tag will not be properly identified. For an active RF tag, if the power source to power the transmitter is depleted, or for some reason cannot generate sufficient power to sustain transmitter operation, the active RF tag will not be properly identified. The present invention overcomes these potential problems by providing an RF tag which includes both passive resonant circuits and an RF transmitter.

SUMMARY OF THE INVENTION

The present invention provides an RF tag including a plurality of RF resonant circuits. The RF resonant circuits are disposed in a three-dimensional array.

In accordance with one aspect of the present invention, the RF tag further includes a body of solid material having a length dimension, a width dimension, and a height dimension. The plurality of RF resonant circuits are disposed within the body in the three-dimensional array.

The present invention further provides an RF tag including a plurality of RF resonant circuits wherein each of the RF resonant circuits has a center axis. The plurality of RF resonant circuits are disposed in spaced apart and substantially axially aligned relation.

In accordance with further aspects of the present invention, at least one of the RF resonant circuits includes a cone shaped body having a substantially circular base, an apex, and a curved surface tapering to the base from the apex and wherein inductance and capacitance means formed on the curved surface resonate at a given RF frequency.

In accordance with a further aspect of the present invention, at least one of the RF resonant circuits includes a spherically shaped body including an equator, a pair of opposite poles, and an arcuately tapered surface extending from the equator to the poles. First inductance and capacitance means are formed on the arcuately tapered surface between the equator and one of the poles for resonating at a first RF frequency. A second inductance and capacitance means may be formed on the arcuately tapered surface between the equator and the other one of the poles for resonating at a second RF frequency.

In accordance with this aspect of the present invention, the RF tag may include an elongated body of solid material with the RF resonant circuits disposed within the elongated body.

The present invention further provides an RF tag including an elongated body of solid material and a plurality of RF resonant circuits disposed within the elongated body in spaced apart relation.

The present invention further provides an RF tag system including an RF tag including an elongated body of solid material and a plurality of RF resonant circuits disposed within the elongated body in spaced apart relation wherein each of the RF resonant circuits is resonant at a given predetermined frequency. The RF tag system further includes an RF tag reader including a plurality of sensors for sensing the presence of the RF resonant circuits and an elongated slot for receiving the elongated body. The plurality of sensors are disposed adjacent to the elongated slot in spaced apart relation for alignment with the RF resonant circuits when the elongated body is received by the elongated slot.

The present invention further provides an RF tag assembly including a base having a substantially planar portion and attachment means for releasably attaching the base to a carrier. The assembly further includes RF circuit means adhered to the base substantially planar portion for identifying the RF tag responsive to received RF energy.

In accordance with this aspect of the present invention, the attachment means may include first and second extensions extending in opposite directions from the substantially planar portion. The extensions are foldable about the carrier for attaching the base to the carrier.

Lastly, the present invention provides a resonant circuit for use in an RF tag. The resonant circuit includes a body of solid material having a non-planar surface and inductance and capacitance means formed on the non-planar surface for resonating at a given RF frequency. The body of solid material may, in accordance with a first embodiment of this aspect of the present invention, be a cone shaped body or, in accordance with a second embodiment, a spherically shaped body.

The present invention further provides an RF tag assembly including active RF circuit means for transmitting an identifying RF signal and passive RF circuit means including a plurality of RF resonant circuits. Each RF resonant circuit is responsive to received RF energy for resonating at a predetermined resonant frequency. The tag assembly further includes enclosure means for encapsulating the active RF circuit means and the passive RF circuit means together.

DESCRIPTION OF THE PREFERRED EMBODIMENTS

Figure 1:
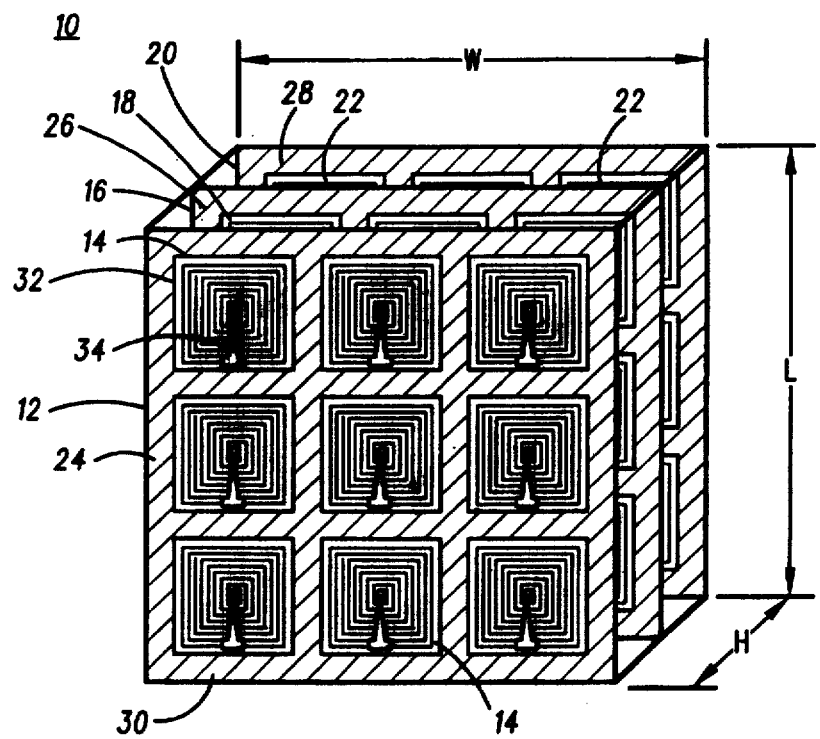
FIG. 1 is a perspective view of an RF tag embodying the present invention which includes a plurality of RF resonant circuits disposed in a three-dimensional array.

Referring now to FIG. 1, it illustrates in perspective view an RF tag 10 embodying the present invention. The RF tag 10 as will be noted in FIG. 1 includes a plurality of RF resonant circuits which are disposed in a three-dimensional array. More specifically, the RF tag 10 includes a first set 12 of RF resonant circuits including a plurality of RF resonant circuits 14, a second set 16 of RF resonant circuits including a plurality of RF resonant circuits 18 and a third set 20 of RF resonant circuits including resonant circuits 22. As will be noted in FIG. 1, each set of resonant circuits is disposed in a different plane. Hence, the resonant circuits of a given set are non-coplanar with the resonant circuits of the other sets.

The resonant circuits of each set of resonant circuits are formed in a single plane on a suitable substrate with the first set of resonant circuits 12 being formed on a substrate 24, the second set of resonant circuits 16 being formed on a substrate 26, and the third set of resonant circuits 20 being formed on a substrate 28. The substrates and hence the plural sets of RF resonant circuits are disposed so as to be substantially coextensive with each other and spaced apart in substantially parallel relation. Further, the RF resonant circuits of each of the plural sets of resonant circuits are arranged to form columns of the RF resonant circuits and to form rows of the RF resonant circuits.

The RF tag 10 further includes a body of solid material 30 which is preferably formed of electrically insulating material. The body of solid material 30 has a width dimension W, a length dimension L, and a height dimension H. The RF resonant circuits 14, 18, and 22 are thus disposed in a three-dimensional array within the body 30 of solid material.

As will be appreciated by those skilled in the art, although the RF tag 10 is represented as having a generally cubic configuration, additional sets of resonant circuits may be provided and the overall configuration of the RF tag may be other than cubic as illustrated without departing from the present invention.

Each of the resonant circuits 14, 18, and 22, in accordance with this preferred embodiment, may be formed as disclosed in the aforementioned cross-referenced co-pending application to include a conductive coil, such as coil 32 which is substantially planar in configuration. Overlying each planar coil is an insulative layer (not shown) and over the insulative layer is a conductive strip 34. The coil 32 and conductive strip 34 form inductance means and capacitance means respectively to cause each resonant circuit to resonate at a predetermined given resonant frequency.

Figure 2:
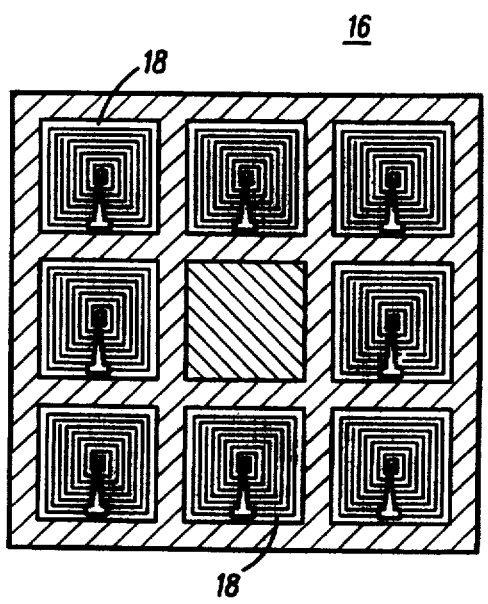
FIG. 2 is a top plan view of a set of RF resonant circuits which may be utilized to advantage in the RF tag of FIG. 1.

In accordance with this preferred embodiment, the outer sets of resonant circuits including the first set of RF resonant circuits 12 and the third set of RF resonant circuits 20 include a three by three matrix of RF resonant circuits. As is depicted in FIG. 2, the second set 16 of RF resonant circuits 18 include RF resonant circuits which are disposed along and thus define only the outer periphery of the RF resonant circuit matrix. As a result, the resonant circuits 18 of the second set 16 are disposed for forming only outer columns of the RF resonant circuits and outer rows of the RF resonant circuits. Hence, the second set 16 of resonant circuits include eight resonant circuits 18.

As will be noted from FIGS. 1 and 2, an RF tag 10 having three sets of RF resonant circuits with the outer sets 12 and 20 of resonant circuits each including a three by three matrix of nine RF resonant circuits and an additional inner set 16 of RF resonant circuits including only the outer eight resonant circuits, will have a total number of resonant circuits equal to 26 RF resonant circuits. The total number of RF resonant circuits may be calculated by using the expression:

$$C = (N)^3 - (N-2)^3;$$

wherein N is greater than 2 and equal to the number of sets of resonant circuits and the number of column and row resonant circuits of the outer sets of resonant circuits.

As a result of the above configuration and expression, a cubic RF tag with four sets of RF resonant circuits with each of the outer sets including a matrix of four column and four rows of RF resonant circuits and with the two inner sets of RF resonant circuits having the central resonant circuits removed would contain a total of 56 RF resonant circuits. The outer sets of RF resonant circuits will each include 16 resonant circuits and the two additional inner sets of RF resonant circuits will each include 12 RF resonant circuits.

Figure 3:
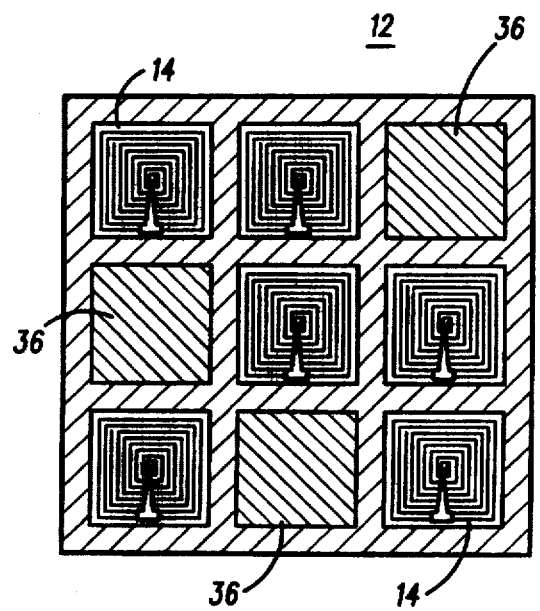
FIG. 3 is a top plan view of another set of RF resonant circuits which may be utilized to advantage in the RF tag of FIG. 1, the set of RF resonant circuits being illustrated in a condition after programming.

Referring now to FIG. 3, it illustrates the manner in which a set of RF resonant circuits may be programmed to provide an RF tag with a particular identification code in accordance with the present invention. In FIG. 3 it will be noted that the set of RF resonant circuits, for example set 12 of RF resonant circuits including RF resonant circuits 14, may be programmed by overlying selected ones of the RF resonant circuits with a continuous layer of conductive ink 36. The conductive ink 36 will render those RF resonant circuits being covered by the conductive ink inoperative so that the RF resonant circuits covered with the conductive ink will not resonate and will not be detected for generating the identification code of the RF tag in which the set 12 of RF resonant circuits is used. As contemplated by the present invention, the sets of RF resonant circuits are thus programmed prior to encapsulation within the body of solid material.

In manufacturing the RF tag 10, the RF resonant circuits are formed on the substrates 24, 26, and 28. Selected ones of the RF resonant circuits 14, 18, and 22 are covered over with the conductive ink 36 for programming each set of RF resonant circuits. Thereafter, the plural sets of RF resonant circuits are aligned within a mold so as to be coextensive and the material in which the RF resonant circuits are to be disposed is injected into the mold. After the material in the mold has solidified, the RF tag 10 is removed to thus render the plurality of RF resonant circuits 14, 18, and 22 disposed in the aforementioned three-dimensional array as depicted in FIG. 1. As will be appreciated by those skilled in the art, the material utilized to form the solid body 30 must have a setting temperature which is below the melting temperature of the substrates 24, 26, and 28 and the materials utilized in forming the planar RF resonant circuits 14, 18, and 22. Selection of such materials is well within the purview of one skilled in the art.

Figure 4:
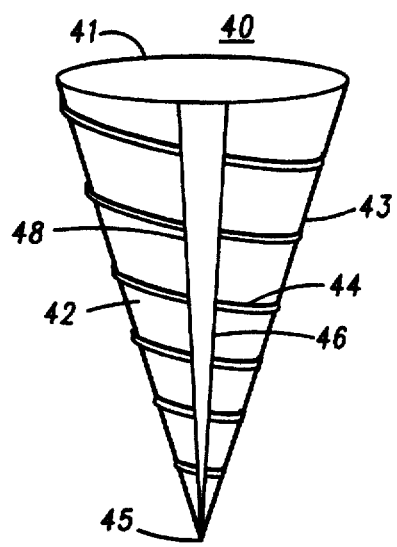
FIG. 4 is a perspective view of an RF resonant circuit embodying the present invention.

Referring now to FIG. 4, it illustrates in perspective view, a first RF resonant circuit 40 which includes a body of solid material 42 having a non-planar surface 43 and an inductance means 44 and a capacitance means 46 formed on the non-planar surface 43 for resonating at a given RF frequency. More specifically, the body of solid material 42 is a cone shaped body having a substantially circular base 41. The non-planar surface 43 is a curved surface tapering from an apex 45 to the base 41. The inductance means 44 is formed by a conductive coil which spirals from the apex 45 to the base 41 on the curved surface 43. An insulating layer (not shown) overlies the conductive coil of inductance means 44. Over the insulating layer is a deposit of conductive material 48 which forms the capacitance means 46. The foregoing configuration provides a distributed inductance and capacitance RF resonant circuit for resonating at a predetermined frequency.

The body of solid material 42 may be formed of an electrically insulative material such as plastic or ceramic. The conical shape may be imparted to the body 42 by molding or the like and the inductance means 44 and capacitance means 46 may be formed on the conical surface 43 through screen printing or similar processes.

Figure 5:
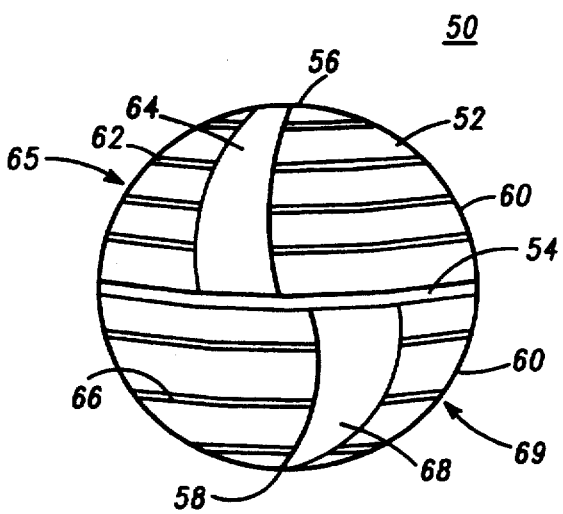
FIG. 5 is a perspective view of another RF resonant circuit embodying the present invention.

Referring now to FIG. 5, it illustrates another RF resonant circuit 50 embodying the present invention. The RF resonant circuit 50 includes a solid body 52 which is spherical in configuration. The body 52 thus includes an equator 54, a pair of opposed poles 56 and 58, and an arcuately tapered surface 60 extending from the equator 54 to the poles 56 and 58. Formed on the body 52 is a first inductance means 62 and a first capacitance means 64 between the equator 54 and the pole 56 for providing a first resonant circuit 65 for resonating at a first predetermined frequency. Also formed on the body 52 is a second inductance means 66 and a second capacitance means 68 between the other pole 58 and the equator 54 for providing a second resonant circuit 69 for resonating at a second predetermined frequency. The inductance means 62 and 66 and the capacitance means 64 and 68 may be formed on the body 52 in the same manner as described with respect to the inductance and capacitance means 44 and 46 respectively of FIG. 4. The RF resonant circuit 50, since it includes two RF resonant circuits, is capable of resonating at two different predetermined resonant frequencies.

As will be appreciated by those skilled in the art, the RF resonant circuits of FIGS. 4 and 5 exhibit a distinct improvement over RF resonant circuits of the prior art which are formed in a substantially planar configuration. Whereas the RF resonant circuits of the prior art have optimal directivity in a plane normal to their substantially planar inductors, the resonant circuits of FIGS. 4 and 5 will have directivity distinctly different from the RF resonant circuits of the prior art. As a result, the RF resonant circuits of FIGS. 4 and 5 may be utilized to advantage in a number of different RF tag applications than heretofore possible.

Figure 6:
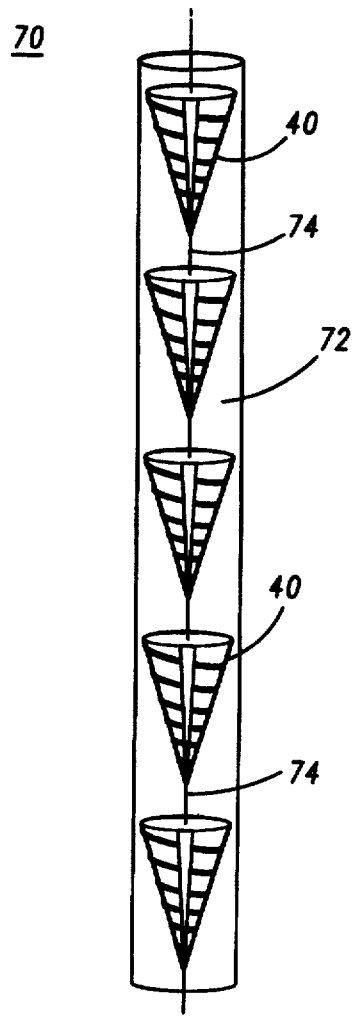
FIG. 6 is a perspective view of an elongated RF tag embodying the present invention.

Referring now to FIG. 6, it illustrates an elongated RF tag 70 embodying the present invention. The RF tag 70 generally includes an elongated body of solid material 72 and a plurality of RF resonant circuits, such as resonant circuits 40 disposed within the elongated body 72 in spaced apart relation. Because the RF resonant circuits 40 have a center axis 74, the RF resonant circuits 40 are preferably disposed in spaced apart and substantially axially aligned relation within the solid body 72. The solid body 72 is preferably columnar in configuration.

Figure 7:
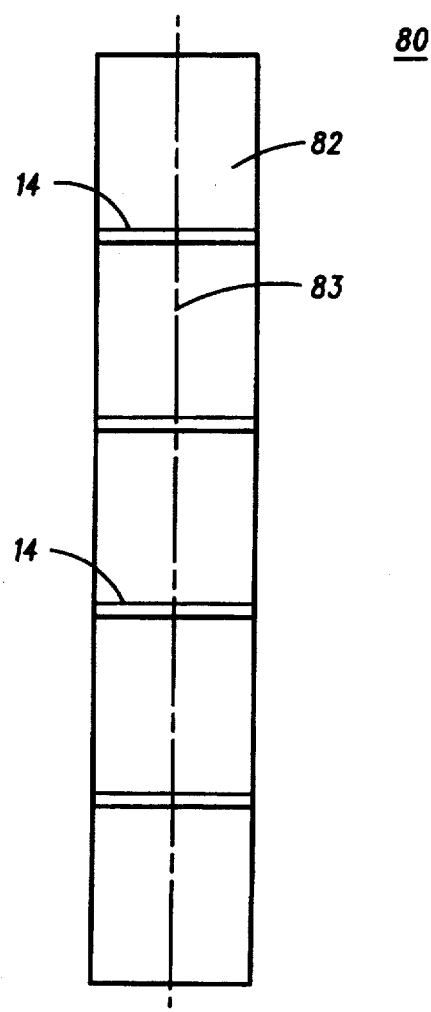
FIG. 7 is a perspective view of another elongated RF tag embodying the present invention.

Referring now to FIG. 7, it illustrates another elongated RF tag 80 embodying the present invention. The RF tag 80 includes an elongated body of solid material 82 and a plurality of RF resonant circuits, such as the substantially planar RF resonant circuits 14 referred to in connection with FIGS. 1 and 3. Again, each of the RF resonant circuits 14 has a center axis 83. The center axis 83 is substantially normal to the plane upon which the conductive coils are formed and the RF resonant circuits 14 are disposed in spaced apart and substantially axially aligned relation within the elongated body 82.

The RF tags 70 and 80 illustrated in FIGS. 6 and 7 respectively may be utilized to advantage in implantable transponder applications. In such applications, because the RF resonant circuits are disposed in an elongated body of solid material 72, 82, the elongated body of solid material may be inserted under the skin of an animal with the RF resonant circuits of the RF tag providing a unique identification code upon detection of the RF resonant circuits. RF resonant tags of the prior art wherein a plurality of RF resonant circuits are formed in a single or common plane are not adapted for such an application.

In addition, it will be noted that the resonant circuits of the RF tags 70 and 80 also have their center axis in common with the center axis of the elongated bodies 72, 82. This relationship is preferred for ease of manufacturing but is not essential. For example, the center axis of the resonant circuits may be spaced apart but still parallel to the elongated body center axis, or may be disposed at an angle thereto without departing from the present invention.

Figure 8:
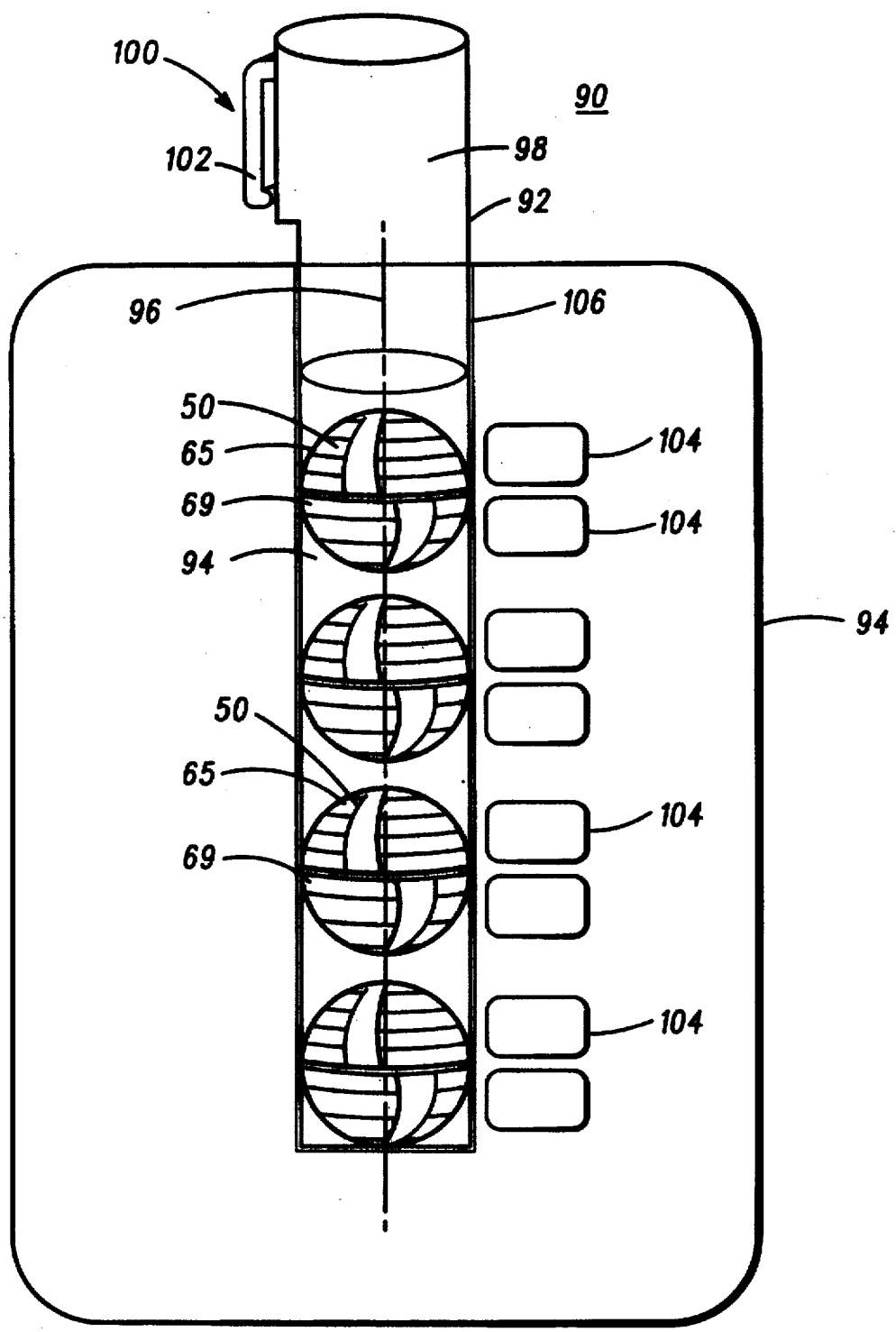
FIG. 8 is a side plan view of an RF tagging system embodying the present invention including a further elongated RF tag embodying the present invention.

Referring now to FIG. 8, it illustrates a further application for elongated RF tags. More specifically, FIG. 8 illustrates an RF tagging system 90 which may be utilized for employee identification or the like. The RF tagging system 90 generally includes an RF tag 92 and an RF tag reader 94. The RF tag 92 includes an elongated body of solid material 94 having disposed therein, in spaced apart relation, a plurality of RF resonant circuits, such as resonant circuits 50 of the type previously described with respect to FIG. 5. Each of the RF resonant circuits 50 includes a center axis 96 and the resonant circuits 50 are disposed within the solid body 94 in spaced apart and axially aligned relation. The RF tag 92 further includes an extension 98 to render the RF tag 92 in a substantially pen-like configuration. The extension 98 includes an attachment means 100 which, in accordance with this preferred embodiment, is in the form of a clip 102 for securing the RF tag 92 to a carrier such as a shirt pocket in the same manner that a pen, for example, would be attached to a shirt pocket.

The RF tag reader 94 includes a plurality of sensors 104 and an elongated slot 106 dimensioned for receiving the RF tag 92 therein as illustrated. The plurality of sensors 104 are disposed adjacent to the elongated slot and are in spaced apart relation for alignment with the resonant circuits 65 and 69 of the RF resonant circuits 50 as illustrated. The presence or absence of an RF resonant circuit may be detected by the sensors 104 in a manner disclosed in the aforementioned cross-referenced co-pending application. More specifically, the presence or absence of the resonant circuits may be detected by, for example, the absorption of RF energy by the RF resonant circuits which are present on the RF tag 92.

In use, an employee inserts the RF tag 92 into the elongated slot 106. Thereupon the RF resonant circuits on the RF tag 92 are detected by the sensors 104 for generating an identification code. If the identification code matches an identification code on a list of authorized identification codes, the employee is provided admittance to a secured work area, for example.

As will be appreciated, any one of the RF resonant circuits previously disclosed herein may be utilized in the system 90. More specifically, either the RF tag 70 of FIG. 6 or RF tag 80 of FIG. 7 may be utilized within the system 90. Even though the RF resonant circuits of the RF tag 80 will be in a plane parallel to the sensors 104, they will be in close enough proximity to the sensors 104 so as to be properly detected.

Figure 9:
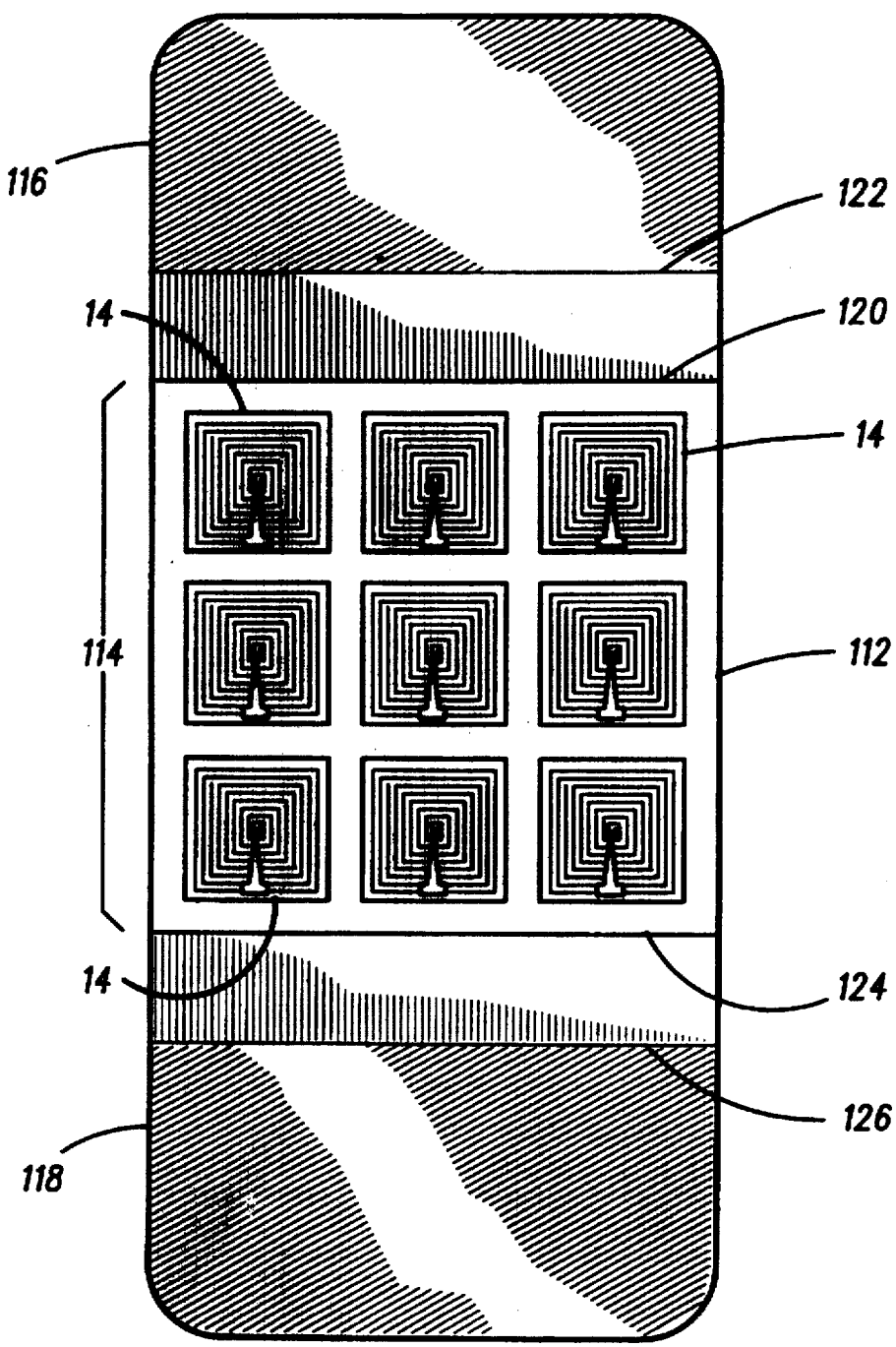
FIG. 9 is a top plan view of an RF tag assembly embodying the present invention.

Referring now to FIG. 9, it illustrates an RF tag assembly 110 embodying the present invention. The assembly includes a base 112 having a substantially planar portion 114. The assembly further includes a plurality of RF resonant circuits, such as resonant circuits 14, adhered to the substantially planar portion 114. The plurality of RF resonant circuits 14 permits identification of the RF tag assembly 110.

The assembly 110 further includes an attachment means to permit the assembly 110 to be releasably attached to a carrier. To that end, the base 112 includes a pair of flexible extensions including a first extension 116 and a second extension 118 and folding lines 120, 122, 124, and 126. The fold lines 120, 122, 124, and 126 permit the extensions 116 and 118 to be foldable about a carrier for attaching the base 114 to the carrier. One such application for the assembly 110 is illustrated in FIGS. 10 and 11.

Figure 10:
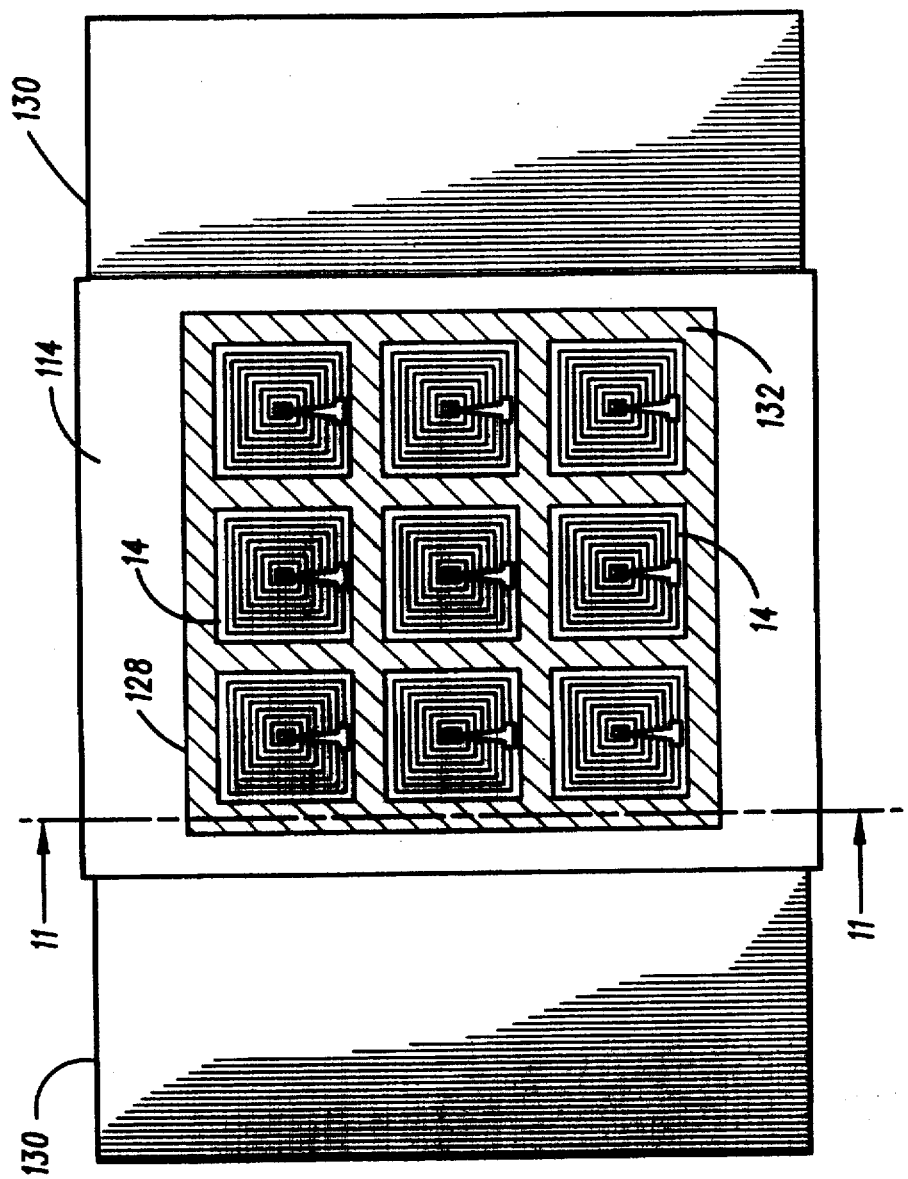
FIG. 10 is a top plan view illustrating the RF tag assembly of FIG. 9 in use.
Figure 11:
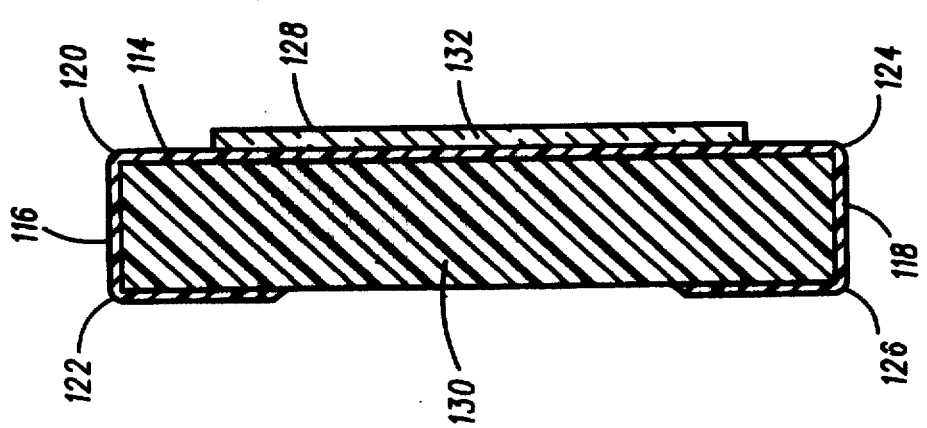
FIG. 11 is a cross-sectional view taken along lines 11—11 of FIG. 10.

As can be seen in FIGS. 10 and 11, the base 114 is attached to a carrier, such as a wrist watch band 130. The extensions 116 and 118 are folded about the band 130 along the fold lines 120, 122, 124, and 126 for attaching the base 114 to the band 130. The plurality of RF resonant circuits are preferably disposed within a solid material 128 to form an RF tag 132 which is adhered to the base 114.

As will be appreciated by the foregoing, the assembly 110 provides an RF tag assembly which is convenient for use for employee identification, for example. All an employee need do is attach the base 114 to a carrier, such as a wrist watch band as illustrated. When the employee is no longer in need of the RF tag 132, the RF tag may be removed without damaging the resonant circuits of the RF tag. As will also be appreciated by those skilled in the art, an active RF transmitter may be substituted for the RF tag 132 for transmitting a predetermined identification code. Such active RF frequency identification transmitters are well known in the art.

Figure 12:
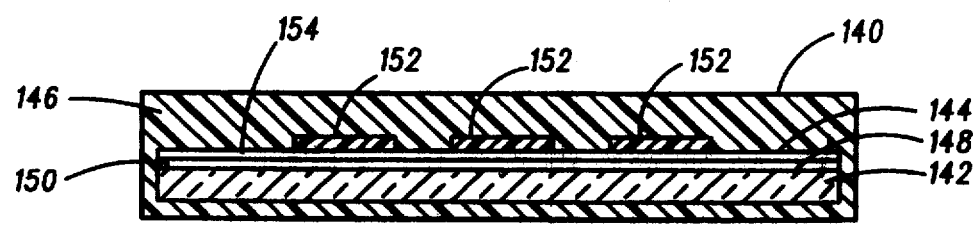
FIG. 12 is a cross-sectional view of another RF tag assembly embodying the present invention which includes both passive and active RF circuits.

Referring now to FIG. 12, it illustrates another RF tag assembly 140 embodying the present invention. The assembly generally includes an active RF circuit 142, a passive RF circuit 144, and an enclosure 146 for encapsulating the active RF circuit 142 and the passive RF circuit 144 together. As will be noted in FIG. 12, the active RF circuit 142 is substantially planar in configuration, having at least one major planar surface 148. A layer 150 of electrically insulating material overlies the major planar surface 148.

The passive RF circuit 144 overlies the layer 150 of insulating material. The passive RF circuit 144 may take the form of one of the sets of RF resonant circuits shown in FIGS. 1, 2, and 3 and thereby includes a plurality of RF resonant circuits 152 taking the form of RF resonant circuits 14 (FIG. 1) formed on an insulating substrate 154. Preferably, the RF resonant circuits 152 are arranged in a 3×3 matrix and may be programmed through the use of conductive ink coated over selected ones of the RF resonant circuits as described in connection with FIG. 3. As a result, each of the uncoated ones of the RF resonant circuits will resonate at a predetermined resonant frequency responsive to receiving RF energy. Those RF resonant circuits of RF resonant circuits 152 will thus provide, when detected, a corresponding identification code for tag 140.

Figure 13:
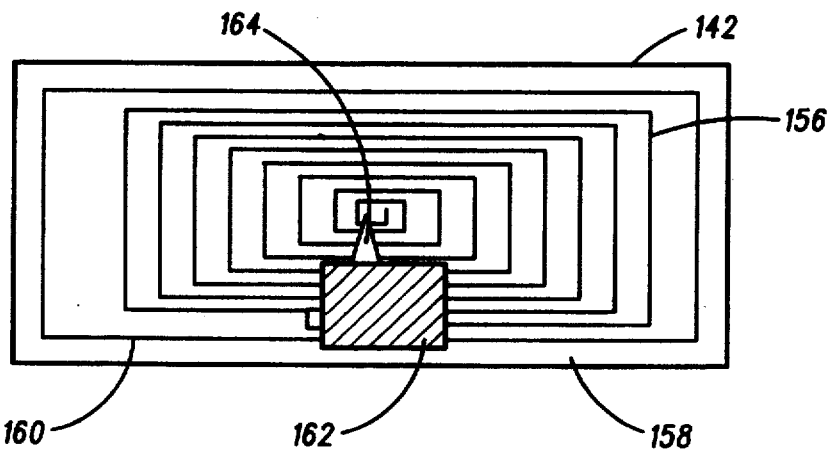
FIG. 13 is a top plan view of the active RF circuit of the RF tag assembly of FIG. 12.

The active RF circuit 142 may be better seen in FIG. 13. It includes a receiving antenna 156 which takes the form of a spiraling conductive pattern formed on an insulating substrate 158 and a transmitting antenna 160 formed by a conductive loop on substrate 158. The active RF circuit 142 further includes an RF transmitter 162 which may be implemented in integrated circuit form in a manner well known in the art. A conductive patch 164 formed over the receiving antenna 156 and spaced therefrom by an insulator (not shown), provides capacitance for tuning the receiving antenna 156 for receiving an interrogation signal having a predetermined frequency. When the receiving antenna 156 receives the interrogation signal, the energy of the interrogation signal is converted into electrical current in a manner well known in the art. The electrical current thereby produced is utilized by the RF transmitter 162 for transmitting an identification signal over transmitting antenna 160. The identification signal is preferably a pulse coded modulated carrier having an identification code corresponding to the identification code produced by the RF resonant circuits 152.

The passive RF circuit 144 and active RF circuit 142 may be encapsulated in enclosure 146 by being disposed in overlying relation within a suitable mold having an inner cavity defining the outer dimensions of the assembly 140. The encapsulating material 146 is then injected into the mold. When the encapsulating material 146 sets, the assembly is removed from the mold.

In operation, the assembly 140, which may be used to advantage for employee identification, enters a detection zone. The presence of the assembly 140 in the detection zone may be detected as described in the aforementioned cross-referenced co-pending application. Once the presence of assembly 140 is detected, the presence of the RF resonant circuits 152 which have not been coated by conductive ink is detected to generate the aforementioned predetermined identification code for assembly 140. Next, the interrogation signal is transmitted. When the assembly 140 receives sufficient energy from the interrogation signal to activate RF transmitter 162, the transmitter transmits the pulse coded modulated carrier. If either the code transmitted by the transmitter 162 or the identification code provided by the RF resonant circuit 152 is on an authorized list (a valid code), the operator carrying the assembly will then be identified as an authorized employee and be permitted access to, for example, a secured work area.

As can thus be seen from the foregoing, the RF tag assembly of FIGS. 12 and 13 is a dual-mode tag requiring two different types of reading methods. The dual modes provide operational flexibility and redundancy. For example, if the first read provides a valid code, the second read may be dispensed with. However, if noise or other conditions are such that one mode is not functioning, then the second reading mode can be employed. Alternatively, for high security applications, a valid tag assembly could be one in which both modes are required to produce a valid identification code.

Figure 14:
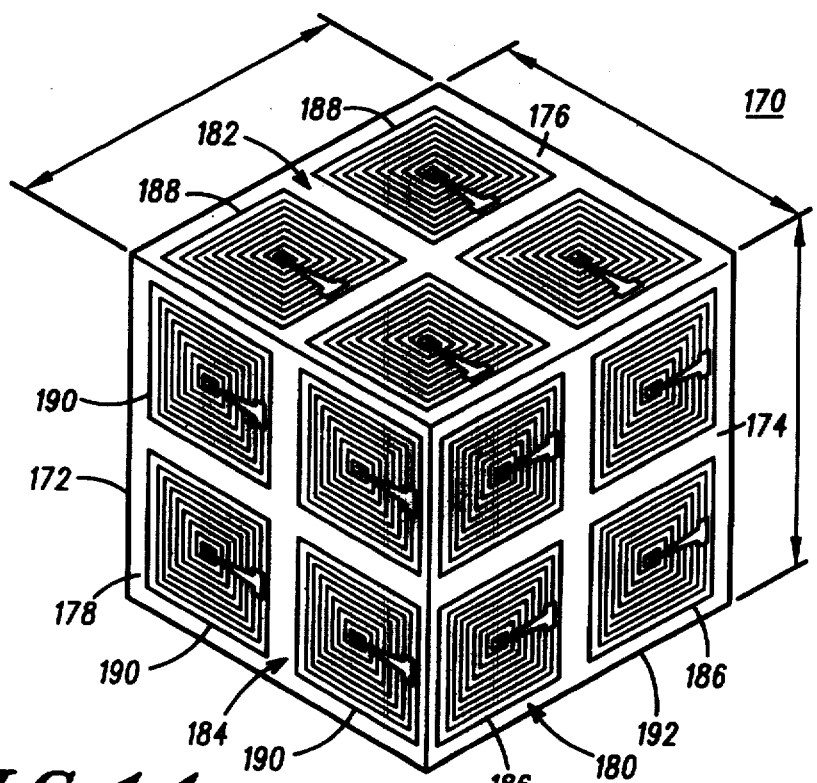
FIG. 14 is a perspective view of another RF tag embodying the present invention which includes a plurality of RF resonant circuits disposed in a three-dimensional array.

Referring now to FIG. 14, it illustrates in perspective view a further RF tag 170 embodying the present invention. The RF tag 170 includes a body 172 of solid material having a width dimension W, a length dimension L, and a height dimension H. The dimensions of the solid body 172 define a plurality of non-coplanar surfaces. Three such non-coplanar surfaces 174, 176, and 178 are illustrated in FIG. 14. While the solid body 172 is illustrated as having a cubic configuration, as will be appreciated by those skilled in the art, other configurations of the solid body 172 are possible without departing from the present invention.

The RF tag 170 further includes plural sets of RF resonant circuits. Three such sets of RF resonant circuits 180, 182, and 184 are illustrated in FIG. 14. The first set 180 of RF resonant circuits includes a plurality of RF resonant circuits 186, the second set of RF resonant circuits 182 includes a plurality of RF resonant circuits 188, and the third set of RF resonant circuits 184 includes RF resonant circuits 190. The RF resonant circuits 186, 188, and 190 may be fabricated in the same manner as the RF resonant circuits of FIG. 1.

Each set of RF resonant circuits 180, 182, and 184 may be disposed on a respective given one of the non-coplanar surfaces of the solid body 172. To that end, RF resonant circuits 186 of the first set 180 are disposed on surface 174, RF resonant circuits 188 of set 182 are disposed on surface 176, and RF resonant circuits 190 of set 184 are disposed on surface 178. Alternatively, the resonant circuits of each set of resonant circuits may be formed in a single plane on a suitable substrate. The substrates including the resonant circuits may then be disposed within a suitable mold whereupon the material forming the solid body 172 is injected into the mold. After the injected material has set, the solid body 172 may be removed from the mold resulting in the resonant circuits 186, 188, and 190 being disposed within the solid body 172. In accordance with either alternative, each set of RF resonant circuits will be disposed along a respective given one of the non-coplanar surfaces of the solid body 172. Hence, resonant circuits 186 of set 180 will be disposed along surface 174, RF resonant circuits 188 of set 182 will be disposed along surface 176, and RF resonant circuits 190 of set 184 will be disposed along surface 178.

While just three surfaces 174, 176, and 178 are illustrated as having RF resonant circuits disposed therealong, the other surfaces defined by the solid body 172 may also have RF resonant circuits disposed therealong. In some applications, even the base surface 192 of the solid body 172 may also have RF resonant circuits disposed therealong.

In accordance with the previous embodiments, each of the RF resonant circuits of the RF tag 170 may be configured to resonate at a predetermined given resonant frequency. For an RF tag having a substantially cubic configuration with RF resonant circuits being disposed along five of the six surfaces of the cube in a 2×2 matrix, as many as 20 resonant circuits may be incorporated within such an RF tag in accordance with the present invention.

While particular embodiments of the present invention have been shown and described, modifications may be made, and it is therefore intended to cover in the appended claims all such changes and modifications which fall within the true spirit and scope of the invention.

What is claimed is:

1. An RF tag comprising a plurality of RF resonant circuits, each of said RF resonant circuits comprising a conductive portion which provides an inductance that determines an electrical resonant frequency for said resonant circuit, said RF resonant circuits being spaced apart and disposed in a three-dimensional array of said RF resonant circuits.

2. An RF tag as defined in claim 1 wherein each said RF resonant circuit includes a conductive coil, said conductive coil being substantially planar in configuration.

3. An RF tag as defined in claim 1 further including a body of solid material, said body having a length dimension, a width dimension, and a height dimension, and wherein said plurality of RF resonant circuits are disposed within said body in said three-dimensional array.

4. An RF tag as defined in claim 1 wherein each of said RF resonant circuits having at least one conductive coil being substantially planar in configuration with at least some of said RF resonant circuits having their coils positioned in different planes than any planar coils of others of said RF resonant circuits.

5. An RF tag as defined in claim 1 further including a body of solid material, said body having a length dimension, a width dimension, and a height dimension defining at least two, non-coplanar surfaces, and wherein said plurality of RF resonant circuits are disposed along said non-coplanar surfaces.

6. An RF tag as defined in claim 5 wherein said plurality of RF resonant circuits comprises plural sets of said RF resonant circuits and wherein each said set of RF resonant circuits is disposed along a respective given one of said non-planar surfaces.

7. An RF tag as defined in claim 5 wherein said body of solid material is cubic in configuration.

8. An RF tag as defined in claim 5 wherein said at least two, non-coplanar surfaces are also nonparallel surfaces.

9. An RF tag comprising a plurality of RF resonant circuits, each of said RF resonant circuits comprising a conductive portion which provides an inductance that determines an electrical resonant frequency for said resonant circuit, said RF resonant circuits being spaced apart and disposed in a three-dimensional array of said RF resonant circuits, wherein said plurality of RF resonant circuits comprise plural sets of said RF resonant circuits, wherein the RF resonant circuits are disposed to form columns of said plural sets of said RF resonant circuits and to form rows of said plural sets of said RF resonant circuits and wherein said plural sets are disposed in substantially parallel and spaced part relation.

10. An RF tag as defined in claim 9 wherein said plural sets of RF resonant circuits are further disposed so as to be substantially coextensive with each other.

11. An RF tag as defined in claim 10 wherein said plurality of RF resonant circuits comprises at least two sets of said RF resonant circuits.

12. An RF tag as defined in claim 11 said at least two sets of RF resonant circuits include an equal number of RF resonant circuits forming said columns of RF resonant circuits and an equal number of RF resonant circuits forming said rows of RF resonant circuits.

13. An RF tag as defined in claim 12 wherein each said at least two sets of RF resonant circuits include an equal number of columns and rows of RF resonant circuits.

14. An RF tag as defined in claim 13 further including at least one additional set of said RF resonant circuits disposed between said at least two sets of RF resonant circuits.

15. An RF tag as defined in claim 14 wherein the RF resonant circuits of said at least one additional set of RF resonant circuits are disposed for forming only outer columns of said RF resonant circuits and outer rows of said RF resonant circuits.

16. An RF tag as defined in claim 15 wherein said RF tag includes N number of said sets of resonant circuits and said additional sets of resonant circuits, combined wherein said at least two sets of RF resonant circuits each include N number of columns and rows RF resonant circuits, wherein said RF tag includes N–2 of said additional sets of RF resonant circuits, and wherein said RF tag includes a total number (C) of said RF resonant circuits equal to: $C = (N)^3 - (N-2)^3$; wherein N>2.

17. An RF tag as defined in claim 12 further including at least one additional set of said RF resonant circuits disposed between said at least two sets of RF resonant circuits.

18. An RF tag as defined in claim 17 wherein the RF resonant circuits of said at least one additional set of said RF resonant circuits are disposed for forming only outer columns of said RF resonant circuits and outer rows of said RF resonant circuits.

19. An RF tag comprising a plurality of RF resonant circuits, each of said each RF resonant circuits having a center axis, said plurality of RF resonant circuits being disposed in spaced apart and substantially axially aligned relation, wherein at least one of said plurality of RF resonant circuits includes a cone shaped body having a substantially circular base, an apex and a curved surface tapering to said base from said apex and inductance and capacitance means formed on said curved surface for resonating at a given RF frequency.

20. An RF tag as defined in claim 19 further including an elongated body of solid material and wherein said RF resonant circuits are disposed within said elongated body.

21. An RF tag comprising a plurality of RF resonant circuits, each of said plurality of resonant circuits having a center axis, said plurality of RF resonant circuits being disposed in spaced apart and substantially axially aligned relation, wherein at least one of said RF resonant circuits includes a spherical shaped body including an equator, a pair of opposite poles, and an arcurately tapered surface extending from said equator to each of said poles, and first inductance and capacitance means formed on said arcurately tapered surface between said equator and one of said poles, said first inductance and capacitance means for resonating at a first RF frequency.

22. An RF tag as defined in claim 21 wherein said at least one of said RF resonant circuits includes second inductance and capacitance means formed on said arcuately tapered surface between said equator and the other one of said poles, said second inductance and capacitance means for resonating at a second RF frequency.

23. An RF tag comprising a plurality of at least three RF resonant circuits, each of said plurality of RF resonant circuits having a center axis, said plurality of RF resonant circuits being disposed in spaced apart and substantially axially aligned relation, wherein each of said plurality Of RF resonant circuits includes inductance and capacitance means for resonating at a given RF frequency, said inductance means being substantially planar in configuration and said center axis for each of said resonant circuits being normal to the planar configuration of the inductance means.

24. An RF tag comprising:

an elongated body of solid materials having an axis; and a plurality of RF resonant circuits disposed within said elongated body in spaced apart relation along said axis, said elongated body being columnar in configuration about its axis and said plurality of resonant circuits forming a columnar array, wherein at least one of said RF resonant circuits includes a cone shaped body having a substantially circular base, an apex, and a curved surface tapering to said base from said apex and inductance and capacitance means formed on said curved surface for resonating at a given RF frequency.

25. An RF comprising:

an elongated body of solid materials having an axis; and a plurality of RF resonant circuits disposed within said elongated body in spaced apart relation along said axis, said elongated body being columnar in configuration about its axis and said plurality of resonant circuits forming a columnar array, wherein at least one of said RF resonant circuits includes a spherically shaped body including an equator, a pair of opposite poles, and an arcuately tapered surface extending from said equator to said poles, and first inductance and capacitance means formed on said arcuately tapered surface between said equator and one of said poles, said first inductance and capacitance means for resonating at a first RF frequency.

26. An RF tag as defined in claim 25 wherein said at least one RF resonant circuit further includes second inductance and capacitance means formed on said arcuately tapered surface between said equator and the other one of said poles, said second inductance and capacitance means for resonating at a second RF frequency.

27. An RF tag comprising:

an elongated body of solid materials having an axis; and a plurality of RF resonant circuits disposed within said elongated body in spaced apart relation along said axis, said elongated body being columnar in configuration about its axis and said plurality of resonant circuits forming a columnar array, wherein at least three of said RF resonant circuits include inductance and capacitance means for resonating at a given RF frequency, and said inductance means being substantially planar in configuration, each of said planar inductance means being positioned in different planes.

28. An RF tag system comprising:

an RF tag including an elongated body, having an axis, of solid material and a plurality of RF resonant circuits disposed within said elongated body in spaced apart relation along said axis, each of said RF resonant circuits being resonant at a given predetermined frequency, said elongated body being columnar in configuration about its axis and said plurality of resonant circuits forming a columnar array, wherein at least three of said RF resonant circuits include inductance and capacitance means for resonating at a given RF frequency, and said inductance means being substantially planar in configuration, each of said planar inductance moans being positioned in different planes; and an RF tag reader including a plurality of sensors for sensing the presence of said RF resonant circuits and an elongated slot for receiving said elongated body, said plurality of sensors being disposed adjacent to said elongated slot in spaced apart relation for alignment of each sensor with one of said RF resonant circuits when said elongated body is received by said elongated slot.

29. An RF tag system comprising:

an RF tag including an elongated body, having an axis, of solid material and a plurality of RF resonant circuits disposed within said elongated body in spaced apart relation along said axis, each of said RF resonant circuits being resonant at a given predetermined frequency; and an RF tag reader including a plurality of sensors for sensing the presence of said RF resonant circuits and an elongated slot for receiving said elongated body, said plurality of sensors being disposed adjacent to said elongated slot in spaced apart relation for alignment of each sensor with one of said RF resonant circuits when said elongated body is received by said elongated slot, wherein at least one of said RF resonant circuits includes a cone shaped body having a substantially circular base, an apex, and a curved surface tapering to said base from said apex and inductance and capacitance means formed on said curved surface for resonating at a given RF frequency.

30. An RF tag system comprising:

an RF tag including an elongated body, having an axis, of solid material and a plurality of RF resonant circuits disposed within said elongated body in spaced apart relation along said axis, each of said RF resonant circuits being resonant at a given predetermined frequency; and an RF tag reader including a plurality of sensors for sensing the presence of said RF resonant circuits and an elongated slot for receiving said elongated body, said plurality of sensors being disposed adjacent to said elongated slot in spaced apart relation for alignment of each sensor with one of said RF resonant circuits when said elongated body is received by said elongated slot, wherein at least one of said RF resonant circuits includes a spherically shaped body including an equator, a pair of opposite poles, and an arcuately tapered surface extending from said equator to each of said poles, and first inductance and capacitance means formed on said arcuately tapered surface between said equator and one of said poles, said first inductance and capacitance means for resonating at a first RF frequency.

31. An RF tag system as defined in claim 30 wherein said at least one RF resonant circuit further includes second inductance and capacitance means formed on said arcuately tapered surface between said equator and the other one of said poles, said second inductance and capacitance means for resonating at a second RF frequency.

32. A resonant circuit for use in an RF tag, said resonant circuit including a body of solid material having a nonplanar surface and inductance and capacitance means formed on said nonplanar surface for resonating at a given frequency, wherein said body is a spherical shaped body including an equator, a pair of poles, and an arcurately tapered surface extending from said equator to said poles to form said non-planar surface, and wherein said inductance and capacitance means are formed on said arcurately tapered surface between said equator and one of said poles.

33. An RF tag assembly comprising:

active RF circuit means for transmitting an identifying RF code signal for identifying said RF tag assembly;

passive RF circuit means including a plurality of RF resonant circuits, each said RF resonant circuit being responsive to received RF energy for resonating at a predetermined resonant frequency, the plurality of RF resonant circuits, by their resonant frequencies, together defining a detectable identification code for also identifying said RF tag assembly; and enclosure means for encapsulating said active RF circuit means and said passive RF circuit means together.

34. An RF tag assembly as defined in claim 33 wherein said active RF circuit means is substantially planar in configuration and having at least one major planar surface, wherein said assembly further includes a layer of insulating material between said major planar surface and said passive RF circuit means.

35. An RF tag assembly as defined in claim 33 further including means for receiving an interrogation signal and wherein said active RF circuit means are responsive to the receipt of said interrogation signal for transmitting said identifying signal.

* * * * *

UNITED STATES PATENT AND TRADEMARK OFFICE
CERTIFICATE OF CORRECTION

PATENT NO. : 5,604,485
DATED : February 18, 1997
INVENTOR(S) : Lauro et al.

It is certified that error appears in the above-indentified patent and that said Letters Patent is hereby corrected as shown below:

In claim 12, col. 12, line 12, after "claim 11", the word --wherein-- should be inserted.

In claim 16, col. 12, line 32, after "rows", the word --of-- should be inserted.

In claim 19, col. 12, line 46, "of said each RF" should be --of said plurality of RF--.

In claim 22, col. 13, line 4, "one of said RF resonant circuits includes" should be --one RF resonant circuit further includes--.

In claim 23, col. 13, line 13, "OF" should be --of--.

In claim 28, col. 14, line 11, "moans" should be --means--.

Signed and Sealed this

Ninth Day of December, 1997

Attest:

Attesting Officer

BRUCE LEHMAN

Commissioner of Patents and Trademarks